US011070919B2

(12) United States Patent
Sennett et al.

(10) Patent No.: US 11,070,919 B2
(45) Date of Patent: Jul. 20, 2021

(54) ACTIVE LOUDSPEAKER AND CABLE ASSEMBLY

(71) Applicant: Bose Corporation, Framingham, MA (US)

(72) Inventors: Brian Sennett, Cambridge, MA (US); Craig Small, Framingham, MA (US); Craig Jackson, Waltham, MA (US); Peter Santoro, Groton, MA (US); William Becker, Sudbury, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 16/843,105

(22) Filed: Apr. 8, 2020

(65) Prior Publication Data

US 2020/0413196 A1    Dec. 31, 2020

Related U.S. Application Data

(62) Division of application No. 16/456,348, filed on Jun. 28, 2019, now Pat. No. 10,652,664.

(51) Int. Cl.
*H01R 24/76* (2011.01)
*H01B 11/18* (2006.01)
(Continued)

(52) U.S. Cl.
CPC ............... *H04R 5/04* (2013.01); *H01R 24/76* (2013.01); *H04R 1/1033* (2013.01); *H04R 3/12* (2013.01);
(Continued)

(58) Field of Classification Search
CPC .......... H04R 1/02; H04R 1/1033; H04R 5/02; H04R 5/04; H04R 3/00; H04R 3/12;
(Continued)

(56) References Cited

U.S. PATENT DOCUMENTS 5,685,730 A * 11/1997 Cameron ............. H01R 13/625
439/333
6,448,500 B1 * 9/2002 Hosaka ................ H01B 9/003
174/113 R
(Continued)

FOREIGN PATENT DOCUMENTS

GB            389339        3/1993
WO      2017/201269 A1    11/2017

OTHER PUBLICATIONS

The International Search Report and the Written Opinion of the International Searching Authority (date of completion Sep. 17, 2020) for PCT Application No. PCT/US2020/039807.

(Continued)

*Primary Examiner* — Thang V Tran
(74) *Attorney, Agent, or Firm* — Brian M. Dingman; Dingman IP Law, PC

(57)    ABSTRACT

A cable assembly configured to electrically connect an active loudspeaker to a source device that comprises a source of electrical power and audio signals. The cable assembly includes a primary sheath, a group of power conductors within the primary sheath and configured to carry electrical power, a group of audio signal conductors within the primary sheath and configured to carry audio signals, a cable-mount connector male plug comprising a first plurality of power pins that terminate a first end of each power conductor and a second plurality of audio signal pins that terminate a first end of each audio signal conductor, wherein the cable-mount connector plug is configured to be coupled to a panel mount connector female socket of the source device, and a cable-mount connector female socket comprising a first plurality of power receptacles that terminate a second end of each power conductor and a second plurality of audio signal receptacles that terminate a second end of each audio signal conductor, wherein the cable-mount (Continued)

connector socket is configured to be coupled to a panel mount connector male plug of the active loudspeaker.

19 Claims, 4 Drawing Sheets

(51) Int. Cl.
    *H04R 1/02*         (2006.01)
    *H04R 3/00*         (2006.01)
    *H04R 5/04*         (2006.01)
    *H04R 5/02*         (2006.01)
    *H04R 1/10*         (2006.01)
    *H04R 3/12*         (2006.01)
    *H01B 11/20*      (2006.01)

(52) U.S. Cl.
    CPC ............... *H04R 5/02* (2013.01); *H01B 11/18* (2013.01); *H01B 11/20* (2013.01); *H04B 2203/54* (2013.01); *H04R 2201/028* (2013.01); *H04R 2420/03* (2013.01); *H04R 2420/09* (2013.01)

(58) Field of Classification Search
    CPC .......................... H04R 27/00; H04R 2420/03; H04R 2420/09; H04R 2201/028; H01B 11/00; H01B 11/18; H01B 11/20; H04B 2203/54; H01R 24/00; H01R 24/76; H01R 31/06; H01R 13/00; H01R 13/02; H01R 13/025; H01R 13/03; H01R 13/04
See application file for complete search history.

(56) References Cited

U.S. PATENT DOCUMENTS

| | | | | |
|---|---|---|---|---|
| 6,800,810 B1* | 10/2004 | Page | ..................... | H01B 11/20 174/102 R |
| 7,342,172 B1* | 3/2008 | Wang | ................. | H01B 11/1083 174/36 |
| 7,646,964 B2* | 1/2010 | Park | ....................... | H04N 5/775 386/248 |
| 2010/0258333 A1* | 10/2010 | Horan | .................... | H01B 13/22 174/78 |
| 2011/0244716 A1* | 10/2011 | Kruckenberg | ......... | H01B 11/00 439/502 |
| 2012/0295462 A1* | 11/2012 | Villarreal | ........... | H01R 13/6397 439/304 |
| 2013/0251163 A1 | 9/2013 | Adamson et al. | | |
| 2016/0023739 A1* | 1/2016 | Brennan | .................. | H02J 1/08 307/9.1 |
| 2017/0273202 A1* | 9/2017 | Joo | ........................ | H01R 24/28 |
| 2018/0254030 A1* | 9/2018 | Mayo | .................. | G10H 1/0091 |
| 2019/0296462 A1* | 9/2019 | Li | ........................ | H01R 12/721 |

OTHER PUBLICATIONS

Anonymous: "Link LK connectors catalogue, edition year 2015", LinkItaly, Dec. 31, 2015, XP055729303; Retrieved from the Internet: URL: https://web.archive.org/web/20160214075031if/http://linkitaly.com/wp-content/uploads/LkConnectorsHD.pdf [retrieved on Sep. 9, 2020; pp. 4-9.

Andreas Gunther: "Aktiv mit Anspruch (Nubert nupro x-300)", Nov. 1, 2018 (Nov. 1, 2018), pp. 38-40, XP055730529, Retrieved from the Internet: URL:https://www.nubert.de/downloads/test-2018-11-nupro-x-3000--audio.pdf [retrieved on Sep. 14, 2020]; the whole document.

* cited by examiner

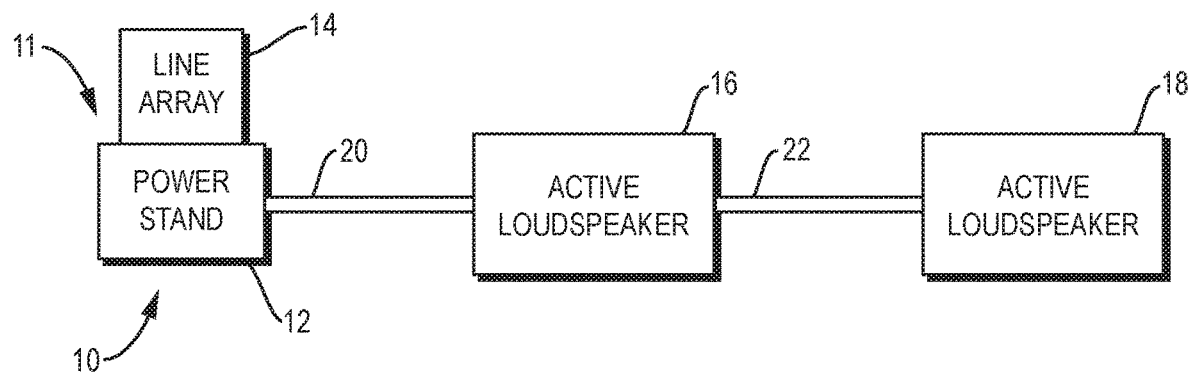
FIG. 1
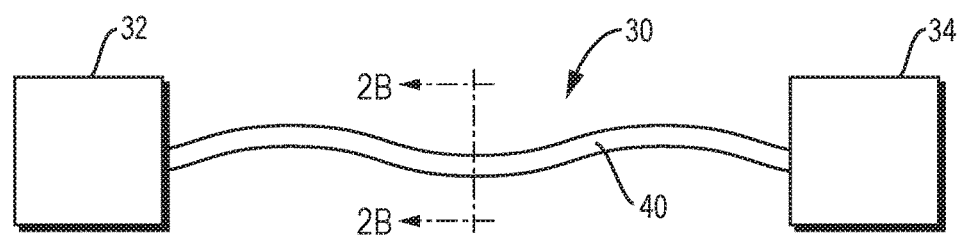
FIG. 2A
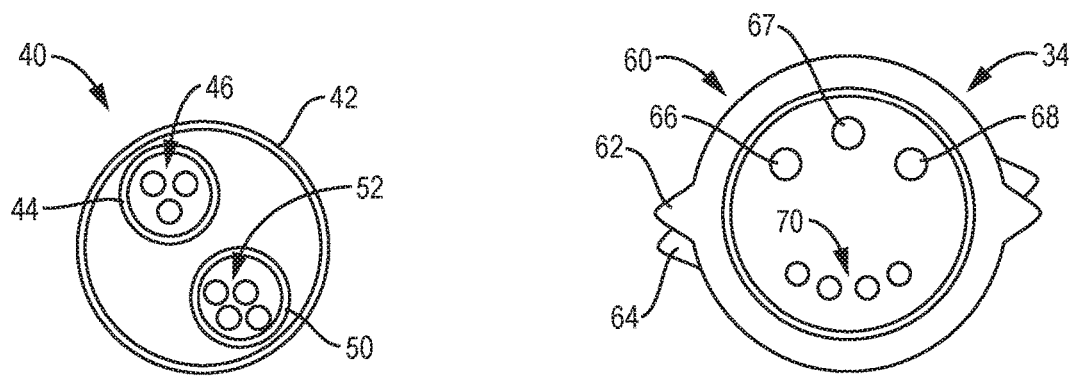
FIG. 2B
FIG. 2C

ACTIVE LOUDSPEAKER AND CABLE ASSEMBLY

CROSS-REFERENCE TO RELATED APPLICATION

This application is a Divisional of application Ser. No. 16/456,348 filed on Jun. 28, 2019, the entire disclosure of which is incorporated herein by reference for all purposes. Priority is claimed.

BACKGROUND

This disclosure relates to a loudspeaker and cable that carries both power and audio signals.

Active loudspeakers have an amplifier and an electro-acoustic transducer. Active loudspeakers thus require both power and audio inputs. If separate cables are used for these inputs, two cables must be connected each time the active loudspeaker is used.

SUMMARY

All examples and features mentioned below can be combined in any technically possible way.

In one aspect, a cable assembly configured to electrically connect an active loudspeaker to a source device that comprises a source of electrical power and audio signals includes a primary sheath, a group of power conductors within the primary sheath and configured to carry electrical power, and a group of audio signal conductors within the primary sheath and configured to carry audio signals. A cable-mount connector male plug comprises a first plurality of power pins that terminate a first end of each power conductor and a second plurality of audio signal pins that terminate a first end of each audio signal conductor. The cable-mount connector plug is configured to be coupled to a panel mount connector female socket of the source device. A cable-mount connector female socket comprises a first plurality of power receptacles that terminate a second end of each power conductor, and a second plurality of audio signal receptacles that terminate a second end of each audio signal conductor. The cable-mount connector female socket is configured to be coupled to a panel mount connector male plug of the active loudspeaker.

Examples may include one of the above and/or below features, or any combination thereof. The cable assembly may further comprise a secondary sheath within the primary sheath, wherein the group of power conductors is within the secondary sheath. The cable assembly may further comprise a tertiary sheath within the primary sheath and outside of the secondary sheath, wherein the group of audio signal conductors is within the tertiary sheath. The cable assembly may comprise at least two audio signal pins. The audio signal pins may be arranged along an arc. The cable assembly may comprise three power pins. The power pins may be arranged along an arc. The power pins may comprise a line pin, a neutral pin, and an earth pin, and the earth pin may be between the line pin and the neutral pin. The power pins may have a greater diameter than the audio signal pins.

Examples may include one of the above and/or below features, or any combination thereof. The plurality of power pins may each have the same length. The panel mount connector female socket of the source device may comprise a plurality of female connectors. One power pin may be an earth pin that is configured to be coupled to an earth female connector of the panel mount connector female socket of the source device. The earth female connector may be closer to an external surface of the panel mount connector female socket of the source device than are the other female connectors of the panel mount connector female socket of the source device, so that the earth pin makes electrical contact with the panel mount connector female socket of the source device before the other power pins make electrical contact with the panel mount connector female socket of the source device. The cable assembly may further comprise a first locking mechanism on the cable-mount connector male plug and configured to removably lock to the panel mount connector female socket of the source device, and a second locking mechanism on the cable-mount connector female socket and configured to removably lock to the panel mount connector male plug of the active loudspeaker. The first and second locking mechanisms may each be push-to-lock and turn-and-pull-to-unlock mechanisms.

In another aspect, an active loudspeaker includes an amplifier that is configured to receive audio input signals and output an audio signal to an electro-acoustic transducer, a line power input connector that is configured to be coupled to a power cord, for receiving power for the amplifier, and a power and audio signal input connector that is configured to be coupled to a first cable assembly, wherein the first cable assembly is configured to carry audio signals and power for the amplifier over a single input cable.

Examples may include one of the above and/or below features, or any combination thereof. The active loudspeaker may further comprise a movable cover that is configured to cover one of the line power input connector and the power and audio signal input connector and leave the other of the line power input connector and the power and audio signal input connector exposed, to allow only one of the power cord and the first cable assembly to be coupled to the active loudspeaker at a time. The movable cover may be configured to slide from a first position where it covers the line power input connector and leaves the power and audio signal input connector uncovered, and a second position where it covers the power and audio signal input connector and leaves the line power input connector uncovered.

Examples may include one of the above and/or below features, or any combination thereof. The line power input connector may comprise a male plug and the power and audio signal input connector may comprise a first plurality of power pins and a second plurality of audio signal pins. The power pins may have a greater diameter than the audio signal pins, and the power pins may comprise a line pin, a neutral pin, and an earth pin, wherein the earth pin is between the line pin and the neutral pin.

Examples may include one of the above and/or below features, or any combination thereof. The active loudspeaker may further comprise a power and audio signal output connector that is configured to be coupled to a second cable assembly that is configured to carry audio signals and power from the active loudspeaker to a second active loudspeaker. The power and output audio signal connector may comprise a female socket that comprises a first plurality of power receptacles that are configured to be coupled to a first plurality of power pins of the second cable assembly and a second plurality of audio signal receptacles that are configured to be coupled to a second plurality of audio signal pins of the second cable assembly. The first plurality of power receptacles may comprise three power receptacles arranged along an arc, and the second plurality of audio signal receptacles may comprise at least two audio signal receptacles arranged along an arc.

BRIEF DESCRIPTION OF THE DRAWINGS

FIG. 1 is a block diagram of an audio system.

FIG. 2A is a side view of a cable assembly for an audio system.

FIG. 2B is a cross-section of the cable of FIG. 2A taken along line 2B-2B.

FIG. 2C is an end view of a cable-mount female socket of the cable assembly of FIG. 2A.

DETAILED DESCRIPTION

Figure 3:
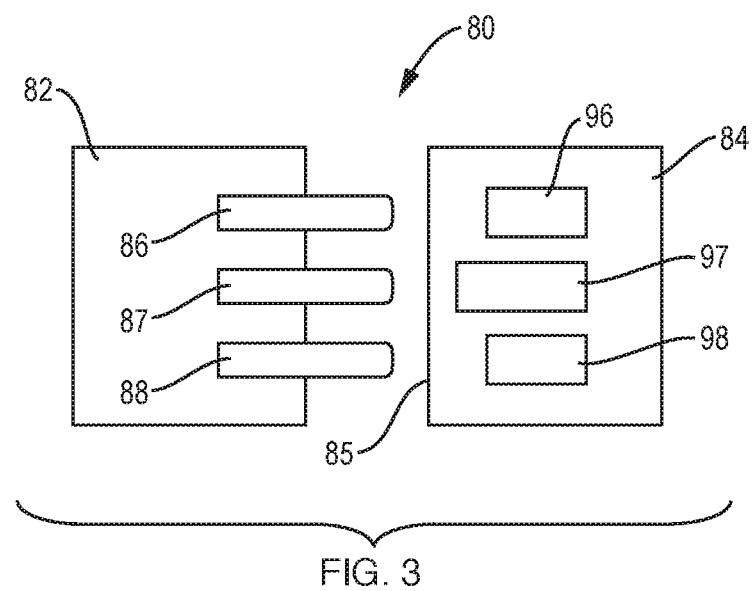
FIG. 3 is a schematic view of the mating of a male plug with a female socket.

This disclosure includes a cable assembly that is configured to electrically connect an active loudspeaker to a source device that comprises a source of electrical power and audio signals. The cable assembly provides electrical power and audio signals over a single cable with one connector at each end. The cable thus allows an active speaker to be functionally coupled to a source device via a single cable connection as compared to existing systems in which two separate connections are made—one for power and the other for audio signals.

One example of the cable assembly includes a cable with a primary sheath, and a group of power conductors within the primary sheath. The primary conductors are configured to carry electrical power. There is a separate group of audio signal conductors within the primary sheath. The audio signal conductors are configured to carry audio signals. A cable-mount connector male plug terminates one end of the cable and comprises a first plurality of power pins that terminate a first end of each power conductor and a second plurality of audio signal pins that terminate a first end of each audio signal conductor. This cable-mount connector plug is configured to be coupled to a panel mount connector female socket of a source device (e.g., a power stand of a line array). A cable-mount connector female socket terminates the other end of the cable and comprises a first plurality of power receptacles that terminate a second end of each power conductor and a second plurality of audio signal receptacles that terminate a second end of each audio signal conductor. This cable-mount connector socket is configured to be coupled to a panel mount connector male plug of the active loudspeaker. The cable assembly thus delivers both power for the amplifier of the active speaker and audio signals to be played by the active speaker.

The active loudspeaker can include an amplifier that is configured to receive audio input signals and output an audio signal to an electro-acoustic transducer, and a line power input connector that is configured to be coupled to a power cord, for receiving power for the amplifier. The active loudspeaker also includes a power and audio signal input connector that is configured to be coupled to the subject cable assembly that carries both audio signals and power for the amplifier over a single input cable.

Audio system 10, FIG. 1, includes non-limiting examples of the cable assembly and active loudspeaker of this disclosure. Audio system 10 includes module 11 that comprises power stand 12 and line array 14. Such modules that comprise a power stand that supports a line array are known in the field. An example of such a module is the Bose® L1 system, available from Bose Corporation, Framingham, Mass., USA. Power stand 12 includes an amplifier and other components that are configured to provide audio signals to the one or more loudspeakers in line array 14. Power stand 12 is also configured to provide power and audio signals to one or more connected active loudspeakers. In this non-limiting example, there are two active loudspeakers 16 and 18. Each active loudspeaker includes an amplifier that requires electrical power in order to operate. The power is received from power stand 12 over cable assembly 20. Each active loudspeaker also includes an electro-acoustic transducer that receives audio signals from the amplifier. The audio signals are received from power stand 12 over cable assembly 20. In one example, active loudspeaker 16 can be configured to pass power and audio signals it received from power stand 12 to second active loudspeaker 18 over second cable assembly 22. The power and audio signals needed by active loudspeakers 16 and 18 are thus both provided to the active loudspeaker over a single cable assembly 20 and 22, respectively. Note that this disclosure is not limited to a system with a line array and a power stand. Rather, this disclosure contemplates other uses of the subject cable assembly, for example used to provide power and audio signals from a source (such as an amplifier) to an active loudspeaker.

An exemplary cable assembly is shown in FIGS. 2A-2C. Cable assembly 30 includes cable 40 bounded on the outside by primary sheath 42. Cable 40 is terminated by cable-mount connectors 32 and 34. Typically but not necessarily one of the connectors is a male plug and the other is a female socket. As explained in more detail below, one reason for this is to prevent an exposed male plug from being live (i.e., carrying power (which is typically but not necessarily 85-250 VAC, 50/60 Hz line power that is provided from an outlet or another source to power stand 12)). In this example, inner secondary sheath 44 encompasses three power conductors 46 (line, neutral, and earth conductors). Inner tertiary sheath 50 encompasses a plurality of audio signal conductors; in this non-limiting example there are two to four conductors used to carry the audio signals, which may be accomplished with one or two twisted pairs of 26 AWG or larger wires, which may be shielded, or may be accomplished with a coaxial cable. In many cases a single twisted pair can be used to carry the audio signals. The audio signals may be analog or digital, depending on the design of the audio system. In one non-limiting example the audio signals comprise digital audio in the S/PDIF format. In one non-limiting example, cable assembly 30 has a diameter of no more than 15 mm and a repeatable bend radius of no less than 7 cm.

Having secondary and tertiary inner sheaths 44 and 50 is beneficial but not necessary. Benefits of using inner sheaths may include (but are not limited to) additional electrical isolation of the power and audio signal conductors, which can help reduce or prevent electromagnetic interference (EMI) and cross-talk, and reduce susceptibility to externally-radiated EMI. Also, inner sheaths can facilitate assembly of cable assembly 30 as the power and signal conductors can be preassembled into their own sheaths and then these two sheaths can be encompassed within primary sheath 42 and terminated by connectors 32 and 34.

Connectors 32 and 34 both terminate an end of all of the power conductors and all of the audio signal conductors. Exemplary female socket connector 34, FIG. 2C, includes receptacles 66-68 that each terminate one of the three power conductors 46. As depicted, receptacles 66-68 can be arranged along an arc, although this configuration is not required. Preferably but not necessarily, there are line, neutral, and earth conductors and contacts (receptacles), and the earth contact is between the line and neutral contacts. Connector 34 also includes a group of four receptacles 70 that each terminate one of the four audio signal conductors 52. In some cases where a single pair of conductors is used for the audio signals, there would only be two data terminations (pins or receptacles). As depicted, receptacles 70 can be arranged along an arc. Note that the power and/or audio terminations do not need to be in any particular arrangement, and do not need to be arranged along arcs. Arrangement of the terminations along arcs may be a space-efficient manner to arrange the terminations within a circular shell, while still maintaining a desired inter-termination spacing (e.g., to meet safety (regulatory) requirements for spacing of power contacts relative to each other and to the signal contacts). When the terminations are arranged along arcs, the radii of the arcs can be the same, or not.

Connectors 32 and 34 are preferably but not necessarily locking connectors, used so as to inhibit inadvertent disconnection. Illustrative, non-limiting examples include auto-latch or assisted bayonet type locking, preferably with push-on, twist-off operation that simplifies connection (accomplished simply by pushing the connector into the mating connector) while at the same time inhibiting inadvertent disconnection by requiring motions in two axes (turn and pull) to disconnect. Push-to-lock and turn-and-pull to unlock connectors that can be configured to terminate the end of a cable carrying both line power and audio are represented in FIG. 2C by outer relatively rotatable and locking connector portions 62 and 64.

As mentioned briefly above, typically but not necessarily one of the connectors 32 and 34 is a male plug and the other is a female socket. One reason for this is to prevent an exposed male plug from being live. For example, when cable assembly 30 is used to connect active loudspeaker 16 to power stand 12, line power is provided from power stand 12 to active loudspeaker 16. In order to inhibit inadvertent electrical shock to a person making or breaking a connection, it is best that any exposed electrical power contact be a female contact rather than a male contact. This way, there is no exposed, protruding live contact. These objectives can be achieved by designing the system such that female cable-mount connector 34 is configured to be fitted into a mating male panel-mount connector of active loudspeaker 16. Cable assembly connector 32 is then a male cable-mount connector or plug that is configured to be fitted into a female panel-mount output connector of power stand 12. Thus, when line power is provided to power stand 12 the live output connectors of power stand 12 are female receptacles that are not exposed or protruding, and when cable assembly 30 is connected to this output connector of power stand 12, the free live end of cable assembly 30 also comprises female receptacles that are not exposed or protruding.

Inadvertent shorting or grounding-related issues can also be inhibited by designing the male/female power connections such that the earth contact is a first-made, last-broken connection. A non-limiting example of how this can be accomplished is shown in FIG. 3. Connector pair 80 comprises male connector 82 with power pins or prongs 86-88, and female connector 84 with mating power receptacles 96-98. Note that the audio signal pins and receptacles are not shown in this drawing, for the sake of simplicity. As stated above, the earth contact is preferably between the other two contacts. Thus, contacts 87 and 97 may be the earth contacts.

Pins 86-88 may all protrude from connector 82 the same amount. The entrance to receptacle 97 may be closer to surface 85 of connector 84 than are the entrances to receptacles 96 and 98. In this way, pin 87 makes electrical contact with connector 84 before pins 86 and 88 make electrical contact with connectors 96 and 98. This helps to ensure proper grounding as connections are made and broken.

As briefly discussed above, the active loudspeaker may be configured to accept line power and audio signals from a source and to pass line power and audio signals to a second active loudspeaker. One advantage of powering a line array and one or more separate active loudspeakers (which may be subwoofers) from the same power source (i.e., the source used for power stand 12 that is also passed to active loudspeaker 16 and active loudspeaker 18 when it is present) is that ground loop hum is inhibited. Ground loop can arise when two or more devices are connected to a common ground through different paths; a system grounded at two points with a potential difference between the grounding points can lead to undesirable ground loop hum. Since in the present case each of devices 12, 14, 16, and 18 is connected to the same earth path, ground loop is avoided.

Figure 4:
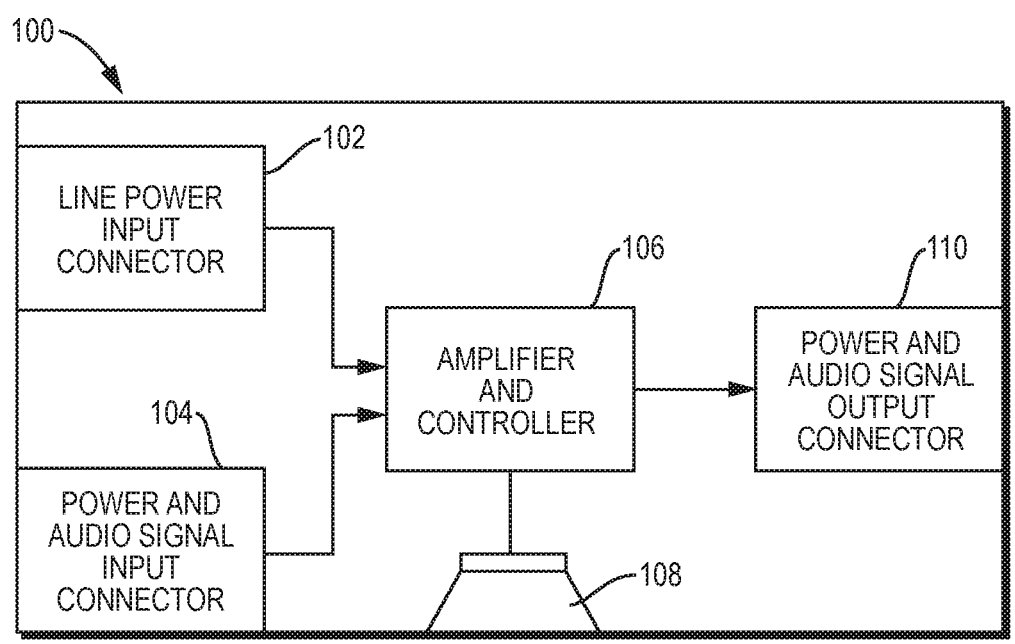
FIG. 4 is a block diagram of an active loudspeaker.

Active loudspeaker 100, FIG. 4, illustrates how these and other features can be accomplished. Active loudspeaker 100 includes an amplifier as well as signal routing and processing control, collectively labelled as amplifier and controller 106. It should be understood that amplification and control may typically be accomplished by different physical components, as is well known in the audio field. It should also be understood that active loudspeakers include more components than are illustrated in FIG. 4; FIG. 4 illustrates only components that are involved in the features described herein.

Sound output is accomplished with one or more electroacoustic transducers, represented by transducer 108. Line power (used at least for the amplifier) can be provided over one of input connectors 102 and 104. Connector 102 may be a traditional line power input connector, which may be a three-prong grounded plug. Connector 104 provides for both line power and audio signal inputs over a single cable with one terminal connector, as described above. One reason to provide a separate line power only input connector 102 is that the active loudspeaker may then be enabled to receive audio signals from a source other than the source (such as power stand 12, FIG. 1) that provides both power and audio signals. This feature can allow active loudspeaker 100 to be used with different audio systems rather than being designed to be used only as part of a dedicated audio system where it must be coupled to a particular source.

When active loudspeaker 100 receives power and audio through connector 104 from a source such as power stand 12, controller 106 may be configured to recognize that the audio was received from the source that is part of integrated audio system 10. Controller 106 and potentially other aspects of loudspeaker 100 can be used to shape the input audio such that the output of transducer 108 appropriately matches the output of line array 14. For example, when line array 14 is configured to output in the mid-high frequency ranges and transducer 108 is used as a subwoofer, the controller can recognize (e.g., by the audio signal type or by other means such as data transmitted along with the audio signals) that the input audio needs to be played in the low range, for example by setting a crossover at the correct frequency. Also, the cable assembly can be configured for bi-directional data transfer, for example by proper control of digital audio signals or by using a separate data conductor (not shown) in the cable assembly. One feature that such data-transfer capabilities can support is the ability to update software for all of the components of audio system 10, FIG. 1, via one outside connection such as a Bluetooth or USB connection to the power stand. This would avoid the need to separately connect each device of system 10 to a source of data for an update.

Active loudspeaker 100 is also configured to pass line power and audio signals to a separate device (such as a second identical active loudspeaker). This can be accomplished with a power and audio signal output connector 110 that receives power that was inputted via either connector 102 or connector 104, and receives audio signals that were inputted via connector 104, or from a separate audio input connector (not shown) when loudspeaker 100 receives audio data from a different source. In order to accomplish the line power safety features described above, output connector 110 is preferably a female connector that can have coupled to it the male (input) end 32 of cable assembly 30, FIG. 2A.

Figure 5:
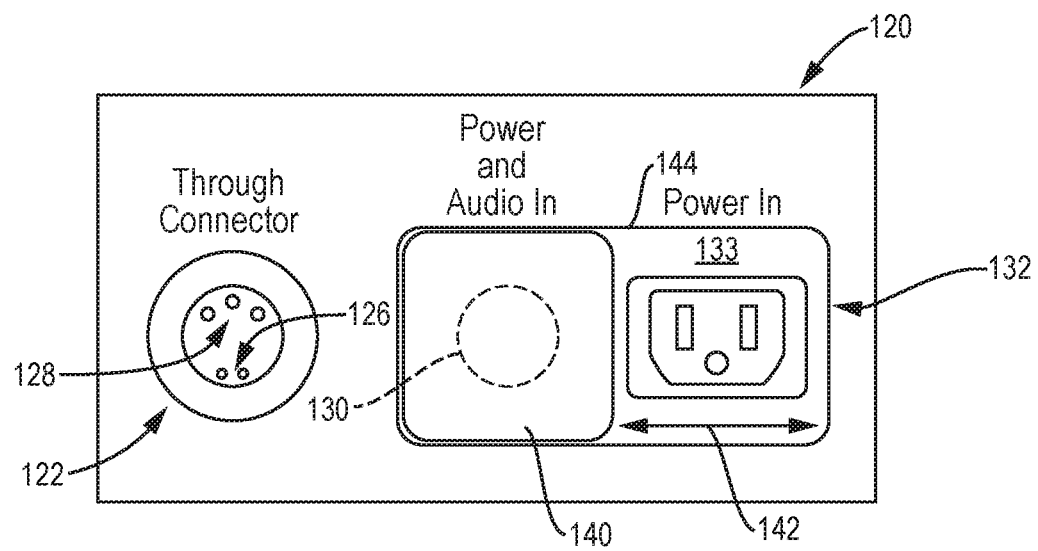
FIG. 5 illustrates exemplary input and output connectors for an active loudspeaker.

FIG. 5 illustrates exemplary input and output connectors for an active loudspeaker such as loudspeaker 16, FIG. 1 and loudspeaker 100, FIG. 4. Panel 120 includes three panel-mount connectors 122, 130, and 132. Connector 130 is in this example hidden behind movable cover 140 that is configured to cover one but not both of input connectors 130 and 132. Connector 130 is an input connector for both line power and audio signals (such as connector 104, FIG. 4). Connector 132 is a three-prong male power plug of the type commonly used for line power. Sliding cover 140 is movable side-to-side in the direction of arrow 142 and is held against or close to outer surface 133 of portion 144 of panel 120. Cover 140 covers the one of these two connectors that is not in use, leaving the other exposed and able to be connected to a cable carrying power and audio, or power alone. One reason for cover 140 is that line power may be wired such that connectors 130 and 132 are both live, so covering the one not in use enhances electrical safety. Output through-connector 122 is a female connector that is able to output power and audio (such as connector 34, FIG. 2C or connector 110, FIG. 4). Connector 122 includes female power terminations 128 and female signal terminations 126. A push-to-lock and turn-and-pull to unlock connector is properly aligned via mating features (not shown). Such connectors are known in the art.

Figure 6:
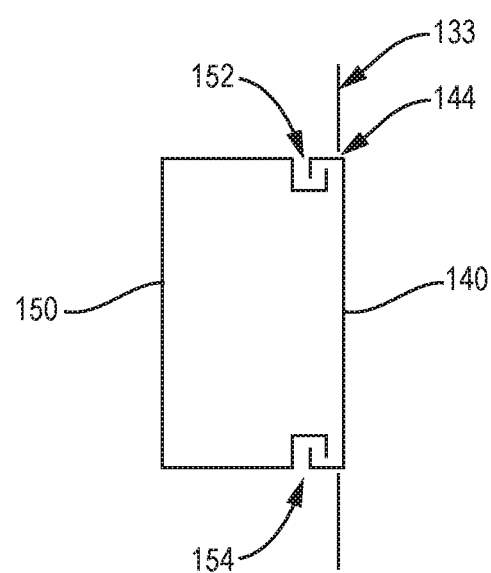
FIG. 6 is a schematic side view of the movable cover depicted in FIG. 5.

FIG. 6 is a schematic side view of the movable cover 140 depicted in FIG. 5. Cover 140 is sandwiched between surface 133 of portion 144 and interior cup 150 that is mounted to the back of portion 144. Sliding can be provided for in any possible manner. Only one such manner is shown in FIG. 6, wherein cover 140 includes upper and lower lips that are held within and may slide within internal recesses 152 and 154 of portion 150 of the loudspeaker. There may be a seal or gasket at the intersection of the cover and the cup, to inhibit vibration of the cover.

Figure 7A:
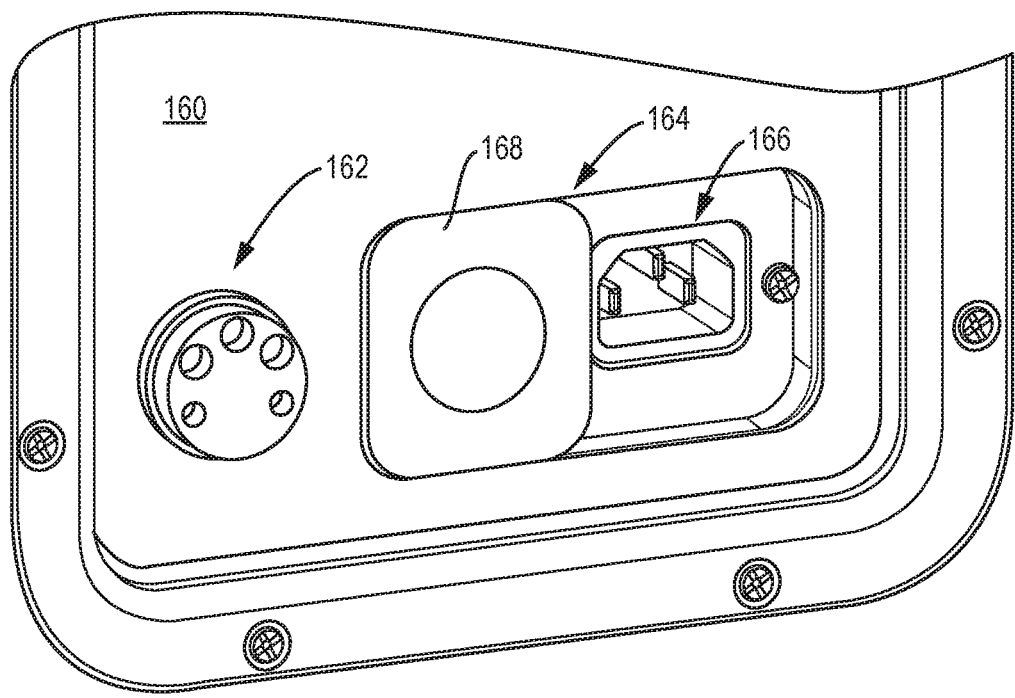
FIGS. 7A and 7B illustrate another example of the movable cover.
Figure 7B:
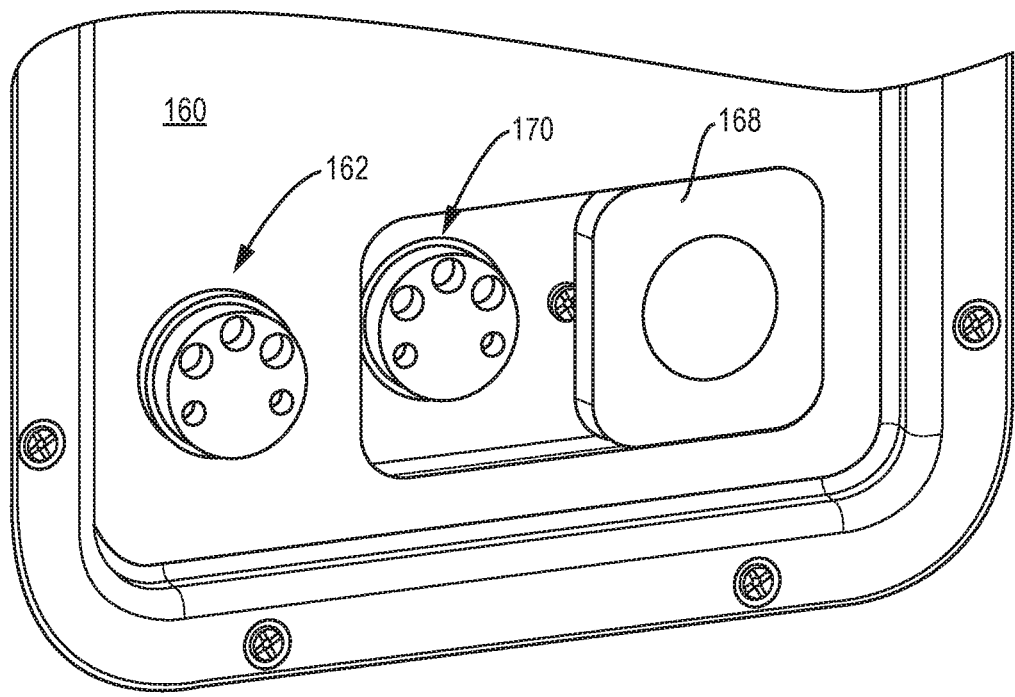

FIGS. 7A and 7B illustrate another example of the movable cover. Panel 160 of an active loudspeaker carries output combined power and audio signal female panel mount connector 162 (illustrated with three large power contacts and two smaller audio signal contacts), input combined power and audio signal male panel mount connector 170 (also illustrated with three large power contacts and two smaller audio signal contacts), and input power only three-prong male connector 166. Sliding door 168 is movable left and right to expose either connector 166 (FIG. 7A) or connector 170 (FIG. 7B).

Elements of figures are shown and described as discrete elements in a block diagram. These may be implemented as one or more of analog circuitry or digital circuitry. Alternatively, or additionally, they may be implemented with one or more microprocessors executing software instructions. The software instructions can include digital signal processing instructions. Operations may be performed by analog circuitry or by a microprocessor executing software that performs the equivalent of the analog operation. Signal lines may be implemented as discrete analog or digital signal lines, as a discrete digital signal line with appropriate signal processing that is able to process separate signals, and/or as elements of a wireless communication system.

When processes are represented or implied in the block diagram, the steps may be performed by one element or a plurality of elements. The steps may be performed together or at different times. The elements that perform the activities may be physically the same or proximate one another, or may be physically separate. One element may perform the actions of more than one block. Audio signals may be encoded or not, and may be transmitted in either digital or analog form. Conventional audio signal processing equipment and operations are in some cases omitted from the drawing.

Examples of the devices, systems and methods described herein comprise computer components and computer-implemented steps that will be apparent to those skilled in the art. For example, it should be understood by one of skill in the art that the computer-implemented steps may be stored as computer-executable instructions on a computer-readable medium such as, for example, floppy disks, hard disks, optical disks, Flash ROMS, nonvolatile ROM, and RAM. Furthermore, it should be understood by one of skill in the art that the computer-executable instructions may be executed on a variety of processors such as, for example, microprocessors, digital signal processors, gate arrays, etc. For ease of exposition, not every step or element of the systems and methods described above is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the disclosure.

A number of implementations have been described. Nevertheless, it will be understood that additional modifications may be made without departing from the scope of the inventive concepts described herein, and, accordingly, other examples are within the scope of the following claims.

What is claimed is:

1. A cable assembly configured to electrically connect an active loudspeaker to a source device that comprises a source of electrical power and audio signals, comprising:
   a primary sheath;
   a group of power conductors within the primary sheath and configured to carry electrical power;
   a group of audio signal conductors within the primary sheath and configured to carry audio signals;
   a secondary sheath within the primary sheath, wherein the group of power conductors is within the secondary sheath;
   a tertiary sheath within the primary sheath and outside of the secondary sheath, wherein the group of audio signal conductors is within the tertiary sheath;
   a cable-mount connector male plug comprising a first plurality of power pins that terminate a first end of each power conductor and a second plurality of audio signal pins that terminate a first end of each audio signal conductor, wherein the cable-mount connector plug is configured to be coupled to a panel mount connector female socket of the source device; and a cable-mount connector female socket comprising a first plurality of power receptacles that terminate a second end of each power conductor and a second plurality of audio signal receptacles that terminate a second end of each audio signal conductor, wherein the cable-mount connector socket is configured to be coupled to a panel mount connector male plug of the active loudspeaker.

2. The cable assembly of claim 1, wherein the power pins have a greater diameter than the audio signal pins.

3. The cable assembly of claim 1, comprising three power pins.

4. The cable assembly of claim 3, wherein the power pins are arranged along an arc.

5. The cable assembly of claim 4, wherein the power pins comprise a line pin, a neutral pin, and an earth pin, and wherein the earth pin is between the line pin and the neutral pin.

6. The cable assembly of claim 1, wherein:
the plurality of power pins each have the same length;
the panel mount connector female socket of the source device comprises a plurality of female connectors;
one power pin is an earth pin that is configured to be coupled to an earth female connector of the panel mount connector female socket of the source device; and
wherein the earth female connector is closer to an external surface of the panel mount connector female socket of the source device than are the other female connectors of the panel mount connector female socket of the source device, so that the earth pin makes electrical contact with the panel mount connector female socket of the source device before the other power pins make electrical contact with the panel mount connector female socket of the source device.

7. The cable assembly of claim 1, comprising at least two audio signal pins.

8. The cable assembly of claim 7, wherein the audio signal pins are arranged along an arc.

9. The cable assembly of claim 1, further comprising a first locking mechanism on the cable-mount connector male plug and configured to removably lock to the panel mount connector female socket of the source device, and a second locking mechanism on the cable-mount connector female socket and configured to removably lock to the panel mount connector male plug of the active loudspeaker.

10. The cable assembly of claim 9, wherein the first and second locking mechanisms are each push-to-lock and turn-and-pull-to-unlock mechanisms.

11. A cable assembly configured to electrically connect an active loudspeaker to a source device that comprises a source of electrical power and audio signals, comprising:
a primary sheath;
a group of power conductors within the primary sheath and configured to carry 85-250 VAC electrical power;
a secondary sheath within the primary sheath, wherein the group of power conductors is within the secondary sheath;
a group of audio signal conductors within the primary sheath and configured to carry audio signals;
wherein all of the power conductors and all of the audio signal conductors are within the primary sheath;
wherein all of the power conductors are within the secondary sheath but none of the audio signal conductors are within the secondary sheath;

a cable-mount connector male plug comprising three power pins, wherein the power pins terminate a first end of each power conductor, and at least two audio signal pins, wherein the audio signal pins terminate a first end of each audio signal conductor, wherein the cable-mount connector plug is configured to be coupled to a panel mount connector female socket of the source device; and a cable-mount connector female socket comprising three power receptacles, wherein the power receptacles terminate a second end of each power conductor, and at least two audio signal receptacles, wherein the audio signal receptacles terminate a second end of each audio signal conductor, wherein the cable-mount connector socket is configured to be coupled to a panel mount connector male plug of the active loudspeaker.

12. The cable assembly of claim 11, further comprising a tertiary sheath within the primary sheath and outside of the secondary sheath, wherein the group of audio signal conductors is within the tertiary sheath.

13. The cable assembly of claim 11, wherein the power pins have a greater diameter than the audio signal pins.

14. The cable assembly of claim 11, wherein the power pins are arranged along an arc.

15. The cable assembly of claim 14, wherein the power pins comprise a line pin, a neutral pin, and an earth pin, and wherein the earth pin is between the line pin and the neutral pin.

16. The cable assembly of claim 11, wherein:
the power pins each have the same length;
the panel mount connector female socket of the source device comprises a plurality of female connectors;
one power pin is an earth pin that is configured to be coupled to an earth female connector of the panel mount connector female socket of the source device; and
wherein the earth female connector is closer to an external surface of the panel mount connector female socket of the source device than are the other female connectors of the panel mount connector female socket of the source device, so that the earth pin makes electrical contact with the panel mount connector female socket of the source device before the other power pins make electrical contact with the panel mount connector female socket of the source device.

17. The cable assembly of claim 11, wherein the audio signal pins are arranged along an arc.

18. The cable assembly of claim 11, further comprising a first locking mechanism on the cable-mount connector male plug and configured to removably lock to the panel mount connector female socket of the source device, and a second locking mechanism on the cable-mount connector female socket and configured to removably lock to the panel mount connector male plug of the active loudspeaker.

19. A cable assembly configured to electrically connect an active loudspeaker to a source device that comprises a source of electrical power and audio signals, comprising:
a primary sheath;
a group of power conductors within the primary sheath and configured to carry electrical power;
a group of audio signal conductors within the primary sheath and configured to carry audio signals;
a cable-mount connector male plug comprising a first plurality of power pins that terminate a first end of each power conductor and a second plurality of audio signal pins that terminate a first end of each audio signal conductor, wherein the cable-mount connector plug is configured to be coupled to a panel mount connector female socket of the source device; and a cable-mount connector female socket comprising a first plurality of power receptacles that terminate a second end of each power conductor and a second plurality of audio signal receptacles that terminate a second end of each audio signal conductor, wherein the cable-mount connector socket is configured to be coupled to a panel mount connector male plug of the active loudspeaker;

wherein:

the plurality of power pins each have the same length;

the panel mount connector female socket of the source device comprises a plurality of female connectors;

one power pin is an earth pin that is configured to be coupled to an earth female connector of the panel mount connector female socket of the source device; and the earth female connector is closer to an external surface of the panel mount connector female socket of the source device than are the other female connectors of the panel mount connector female socket of the source device, so that the earth pin makes electrical contact with the panel mount connector female socket of the source device before the other power pins make electrical contact with the panel mount connector female socket of the source device.

* * * * *